United States Patent

Bauer et al.

[11] Patent Number: 6,049,862
[45] Date of Patent: *Apr. 11, 2000

[54] SIGNAL PROCESSOR EXECUTING COMPRESSED INSTRUCTIONS THAT ARE DECODED USING EITHER A PROGRAMMABLE OR HARDWIRED DECODER BASED ON A CATEGORY BIT IN THE INSTRUCTION

[75] Inventors: Harald Bauer; Peter Kempf, both of Nürnberg; Dietmar Lorenz, Erlangen; Peter Meyer, Fürth, all of Germany

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/895,407

[22] Filed: Jul. 16, 1997

[30] Foreign Application Priority Data

Jul. 19, 1996 [DE] Germany .................. 196 29 130

[51] Int. Cl.$^7$ ........................................... G06F 9/30
[52] U.S. Cl. ............................. 712/208; 712/213
[58] Field of Search ................... 395/384, 385, 395/388, 389; 326/105; 712/208–209, 212–213

[56] References Cited

U.S. PATENT DOCUMENTS

| | | | |
|---|---|---|---|
| 3,889,242 | 6/1975 | Malmer, Jr. ........................... | 395/567 |
| 4,484,268 | 11/1984 | Thoma et al. ........................ | 395/388 |
| 4,697,250 | 9/1987 | Lee et al. ............................. | 395/573 |
| 4,992,933 | 2/1991 | Taylor ............................. | 395/800.22 |
| 5,335,331 | 8/1994 | Murao et al. ........................ | 395/389 |
| 5,408,674 | 4/1995 | Norrie et al. ........................ | 395/384 |
| 5,568,646 | 10/1996 | Jagger ................................. | 395/385 |
| 5,619,665 | 4/1997 | Emma .................................. | 395/384 |

(List continued on next page.)

FOREIGN PATENT DOCUMENTS

| | | | |
|---|---|---|---|
| 0324308A2 | 7/1989 | European Pat. Off. .......... | G06F 9/30 |
| 95/27244 | 10/1995 | WIPO ............................... | G06F 9/30 |

OTHER PUBLICATIONS

Bird, P., et al., "An Instruction Stream Compression Technique," CSE–TR–319–96, Univ. of Michigan, pp. 1–21, Nov. 1996.

Chen, I., et al., "The Impact of Instruction Compression on I–Cache Performance," CSE–TR–330–97, Univ. of Michigan, pp. 1–8, 1997.

Lefurgy, C., et al., "Improving Code Density Using Compression Techniques," CSE–TR–342–97, Univ. of Michigan, pp. 1–17, Jul. 1997.

(List continued on next page.)

Primary Examiner—Zarni Maung
Assistant Examiner—Andrew Caldwell
Attorney, Agent, or Firm—Dicran Halajian

[57] ABSTRACT

A signal processor is disclosed having a program memory which stores compressed program instructions and a decoder device which decodes the compressed program instructions to form decoded program instructions for controlling functions of the signal processor. The decoder device has a programmable decoder and a fixed decoding arrangement, where the fixed decoding arrangement is non-programmable and hardwired for decoding the compressed program instructions using logical operations. The programmable decoder includes a decoder memory, such as a ROM or RAM, having cells for storing the decoded program instructions in an uncompressed form. These cells are addressed for executing programmable decoding functions of the programmable decoder. The compressed program instructions include a first number of bits for determining a category of the compressed program instructions and a second number of bits for determining the address of the cells. A control unit detects the category of the compressed program instructions and outputs a control signal to a multiplexer, which selectively connects the programmable decoder or the fixed decoding arrangement to the output of the signal processor.

20 Claims, 1 Drawing Sheet

U.S. PATENT DOCUMENTS

| | | | |
|---|---|---|---|
| 5,619,714 | 4/1997 | Nishimura | 395/381 |
| 5,632,024 | 5/1997 | Yajima et al. | 395/381 |
| 5,636,352 | 6/1997 | Bealkowski et al. | 395/384 |
| 5,640,248 | 6/1997 | Hirokawa | 358/406 |
| 5,652,852 | 7/1997 | Yokota | 395/384 |
| 5,742,781 | 4/1998 | Bajwa | 395/384 |
| 5,758,115 | 5/1998 | Nevill | 395/385 |
| 5,768,597 | 6/1998 | Simm | 395/712 |
| 5,784,585 | 7/1998 | Denman | 395/385 |
| 5,787,302 | 7/1998 | Hampapuram et al. | 395/800.24 |
| 5,794,010 | 8/1998 | Worrell et al. | 395/385 |
| 5,826,054 | 10/1998 | Jacobs et al. | 395/389 |
| 5,852,741 | 12/1998 | Jacobs et al. | 395/800.24 |
| 5,867,681 | 2/1999 | Worrell et al. | 712/208 |
| 5,870,576 | 2/1999 | Faraboschi et al. | 712/210 |
| 5,878,267 | 3/1999 | Hampapuram et al. | 395/705 |
| 5,884,071 | 3/1999 | Kosaraju | 712/245 |
| 5,896,519 | 4/1999 | Worrell | 712/213 |
| 5,922,067 | 6/1999 | Nakayama | 712/208 |

OTHER PUBLICATIONS

Hennessy, J., et al., Computer Architecture: A Quantitative Approach, 2nd ed., Morgan Kaufmann, C1–26, Aug. 1995.

Opcode Remap and Compression in Hard Wired RISC Microprocessor, IBM TDB n10a 03–90, p. 349, Apr. 1993.

By IBM Technical Disclosure Bulletin, "Designing Flexibility into Hardwired Logic" vol. 37, Mar. 1, 1994, pp. 321–324.

SIGNAL PROCESSOR EXECUTING COMPRESSED INSTRUCTIONS THAT ARE DECODED USING EITHER A PROGRAMMABLE OR HARDWIRED DECODER BASED ON A CATEGORY BIT IN THE INSTRUCTION

BACKGROUND OF THE INVENTION

The invention relates to a signal processor comprising a program memory for storing compressed program instruction words, and a decoder for decoding the compressed program instruction words which are used in decoded form to control functions of the signal processor.

Digital signal processors (DSP) are special microprocessors having a high computing speed, whose instruction sets and architectures are tuned to special requirements in the field of digital signal processing and which are particularly used for converting complex algorithms in real time. For example, signal processors are used in the field of mobile radio according to the GSM standard where they are used in mobile radios (mobile stations) or base radio stations for converting complex speech processing algorithms. Further fields of application are, for example, audio, video, medical and automotive technology.

Customary signal processors have a program memory in which program instructions are stored in compressed form (ie in encoded form), which, when called, leads to parallel execution of different signal processing operations, for example, simultaneous execution of two data transfers over two different data buses, two address computations, one arithmetic/logic operation and one multiplication. Examples of customary signal processors are the Philips PCF 5083 (KISS), the AT&T DSP 16xx and the Texas Instruments TMS 320. The program instructions are stored as 16-bit words in program memories in these signal processors. In the case of a decoding (decompression) by means of a decoder, the compressed 16-bit program instruction words are converted (expanded) to program instruction words having a larger word size which depends on the complexity of the signal processor used. A typical word size for the expanded program instruction words lies between 32 and 128 bits. A call of program instructions during a program run causes a parallel signal processing to be realized, in which the individual bits of the decoded program instruction words are applied to respective control lines of the signal processor. Compared to storing the program instructions in uncompressed form, the storing of the program instructions by means of compressed program instruction words leads to a reduction of the memory space requirement and is possible, because the number of the various theoretically possible program instruction words is limited accordingly.

The decoding of program instruction words in such signal processors is effected by a hardwired decoder which performs the decoding by logical operations. Based on the compression of the program instruction words and compared to the theoretical maximum of different program instruction words, only an accordingly reduced number of different compressed program instruction words can be coded in the program memory. Combined with the use of a hardwired decoder, this leads to a restricted program instruction set (restricted parallel signal processing). In the example mentioned above, only $2^{16}$ different program instruction words or program instructions respectively, are possible with compressed program instruction words having 16 bits. In theory, $2^{32} \ldots 2^{128}$ different program instruction words would be conceivable. Further program instructions linked with another combination of different signal processing operations, which program instructions would certainly be possible based on the given signal processor architectures, cannot be used for programming the signal processor. With special compute-bound applications, for example, with the conversion of the half rate CODEC or the enhanced full rate CODEC in the field of mobile radio (GSM), the predefined standard instruction set of the signal processor described above is not sufficient for an effective conversion of the respective complex signal processing algorithms in real time.

OBJECTS AND SUMMARY OF THE INVENTION

It is an object of the invention to provide a signal processor which, compared to signal processors known thus far of the type defined in the opening paragraph, makes optimum adaptation to the respective field of application possible.

The object is achieved in that the decoding functions of the decoder are partly fixed and partly programmable.

In this manner, a modification of the program instruction set is made possible while the total number of possible program instructions remains unchanged. The advantage of the reduction of the required program memory space resulting from the reduced required word size for one program instruction due to compression is maintained. Additionally, when changing or substituting certain program instructions by changing the programmable decoding function of the decoder, the program instruction set can be adapted so that the signal processor can be optimally used for special applications which are highly compute-intensive. Moreover, the programmable decoding functions allow of modification even during the operation of the signal processor, or of a device in which the signal processor is used, in that new decoding tables substituting the previously loaded decoding tables are loaded, to enable an adaptation to different operational states. The throughput of the signal processor is increased by the described adaptation of the program instruction set, which advantageously also leads to a reduction of the power consumption. This is a considerable advantage when used in mobile radio stations.

For executing the programmable decoding functions of the decoder, there is preferably provided to address memory cells of a memory of the signal processor, in which decoded program instruction words are stored. In this manner, decoding tables can be converted. Other decoded program instruction words are obtained by means of the fixed (hard-wired) part of the decoder. The programmable decoder used is simple, effective, and variable. The memory used for storing the program instructions in their decoded (decompressed) form is preferably arranged as a RAM or as a ROM. Based on the high flexibility, the memory arranged as a RAM is particularly used in signal processors still in the development phase, or produced in smaller numbers. In addition, the arrangement of the memory as a RAM is advantageous in that the instruction set of the signal processor can also be changed while the signal processor is in operation. The arrangement as a ROM is preferably used in signal processors marketed on a large scale to achieve a cost reduction compared to the use of RAM memories.

In an embodiment of the invention, there is provided that a compressed program instruction word provided by the program memory contains a first number of bits for determining a category of the program instruction, and a second number of bits for determining the address of a memory cell of the memory, a programmable decoding function of the decoder being provided for decoding the program instruction word. With the first number of bits, the different program instructions/categories of program instructions are identified. These bits also determine whether a decoding (decompression) is carried out with the aid of the fixed or programmable part of the decoder. The second number of bits are further necessary for converting the respective program instructions and define the program instructions in their details with respect to the generation of respective bits to be applied to control lines for generating signal processing steps which are to be carried out. In the programmable decoder part, these bits are stored in the memory cells of said memory and are read out in accordance with the address via the second number of bits and applied to the respective control lines of the signal processor.

The invention likewise relates to a mobile radio terminal and a radio base station comprising a signal processor according to the invention, which is used in these applications for digital signal processing, for example, for converting speech processing algorithms, for channel coding/decoding and/or for converting equalizer functions. Furthermore, it is advantageous to use the signal processor for digital signal processing also in other devices, for example, in radio equipment for digital radio, ISDN terminals and DECT systems (Digital European Cordless Telephone).

These and other aspects of the invention will be apparent from and elucidated with reference to the embodiments described hereinafter.

DETAILED DESCRIPTION OF THE PREFERRED EMBODIMENTS

Figure 1:
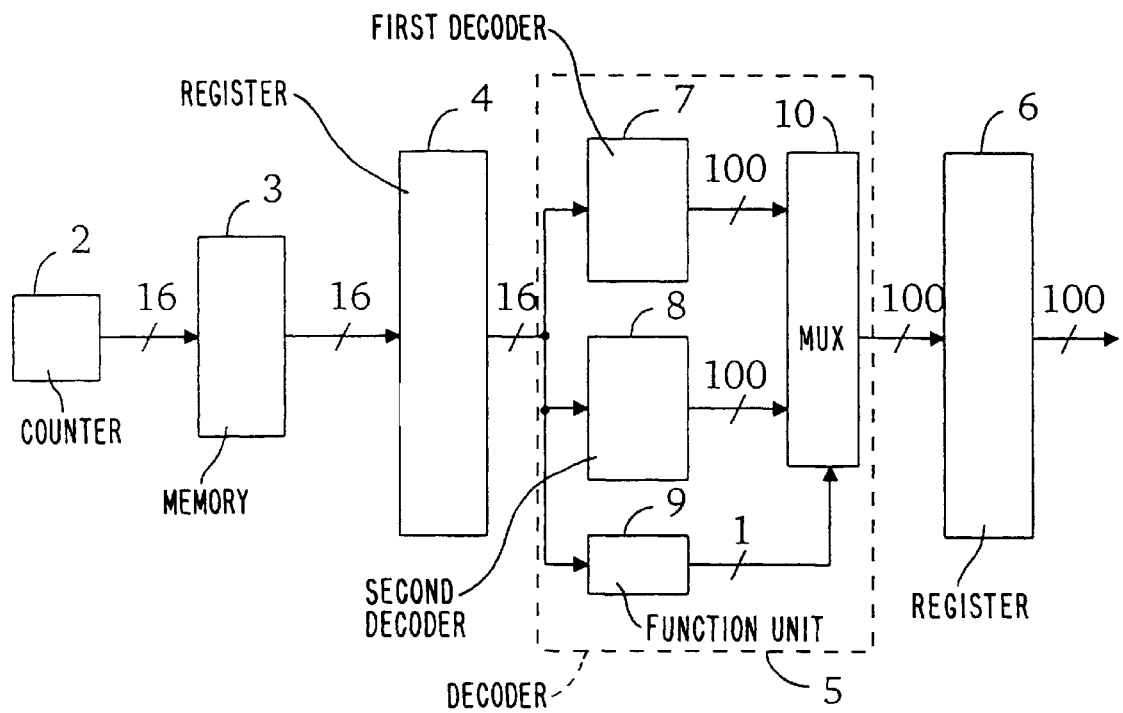
FIG. 1 shows a signal processor structure describing the invention.

The signal processor structure shown in FIG. 1, which does not show the parts of the associated signal processor which are not essential to the invention for clarity reasons, comprises a program counter 2 which drives a program memory 3 by 16-bit-wide control signals. The program instructions necessary for converting a program are stored in program memory 3 by means of coded (ie compressed) program instruction words. In the present case, the compressed program instruction words have each 16 bits which are decoded (ie decompressed) into 100-bit-wide program instruction words as described hereinafter. The usual size of the decoded program instruction words lies between 32 and 128 bits.

When a program instruction is called, first the respective compressed program instruction word stored in the program memory 3 is read out and buffered in a register 4. Such a program instruction word is subsequently applied to the decoder 5 which converts the compressed program instruction word of 16 bits into a decoded 100-bit program instruction word. The 100-bit program instruction word generated by the decoder 5 is applied to control lines of the signal processor after being buffered in the register 6, to control an associated signal processing function of the signal processor. In the present case, the signal processor has 100 parallel control lines to which the 100 bits of a program instruction word buffered in register 6 are applied in parallel.

The decoder 5 comprises a first decoder section 7, a second decoder section 8, a function unit 9 for detecting program instruction categories, and a multiplexer 10. The compressed 16-bit program instruction words buffered in register 4 are applied in parallel to the first and second decoder sections and the function unit 9.

Figure 2:
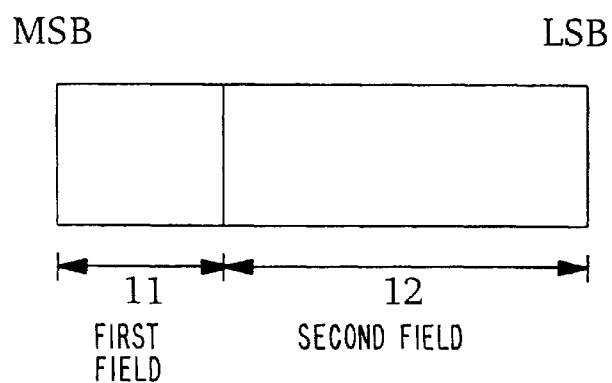
FIG. 2 shows the structure of a compressed program instruction word.

Such a program instruction word has the shape shown in FIG. 2. It comprises a first field 11 and a second field 12. The bits belonging to the first field 11 describe the respective category of the program instruction, ie the format of a program instruction. The second field 12 contains bits for precisely determining the details of the respective program instruction. As will be explained hereinafter, the second field 12 may also contain addresses. The first field 11 contains the higher-order bits of the program instruction word referenced MSB (Most Significant Bits). The second field 12 contains the further lower-order bits referenced LSB (Least Significant Bits). The division of the total number of bits available into the two fields 11 and 12 is variable and depends on the respective categories of program instructions.

A program instruction word compressed and produced by register 4 is decoded either by the decoder section 7 or the decoder section 8 (decompressed). The decoder section 7 includes a hardwired decoding arrangement which generates a 100-bit program instruction word from a compressed 16-bit program instruction word by suitable logical operations. A decoding of a compressed 16-bit program instruction word delivered by the register 4, however, may also be effected by the decoder section 8. This section 8 is a programmable 100-bit-wide memory in whose memory cells are stored the decompressed 100-bit program instruction words which are to be generated from the compressed 16-bit program instruction words. In the present example this memory is arranged as a ROM. However, particularly for the purpose of development, an arrangement as a RAM is advantageous due to its larger flexibility. The decoding by the programmable decoder section 8 is effected by addressing the memory cells via the second field 12 of the compressed 16-bit program instruction words and by reading the memory contents of the addressed memory cells. Which one of the decoder sections 7 or 8 is used for the decoding is determined by the first field 11 of the respective compressed 16-bit program instruction words (see FIG. 2). Which categories of program instructions belong to which decoder section is determined a priori, so that when the signal processor is in operation, a respective assignment to the decoder section 7 or to decoder section 8 may be effected.

The programmable decoder section 8, contrary to the decoder section 7, is used for decoding application-specific program instruction words (also denoted ASI "Application Specific Instructions"). Depending on the application, the memory 8 allows to be overwritten by new decoding dates to provide a change of the decoding functions. In contrast, the decoding functions which can be performed by means of the hardwired decoder section 7 cannot be changed. Therefore, the decoder section 7 is used for implementing decoder functions belonging to program instructions which are provided for many different applications and are thus not application-specific.

In the present example with compressed 16-bit program instruction words, a maximum of $2^{16}$ different program instructions can be realized. Assuming that N program instructions are converted by the decoder section 8, the decoder section 7 is used for converting $2^{16}$-N standard program instructions. A typical range for N is given by $64 \leq N \leq 512$. However, N strongly depends on possible operational areas of the signal processor.

Since program instructions especially tuned to a specific application can be realized with the aid of the programmable decoder section 8, a higher processing rate or a higher throughput of the signal processor can be achieved based on the more effective parallel signal processing possible in this manner, which at the same time brings about a reduction of the power consumption. For example, available standard operations (arithmetical operations, data transfers over the data buses of the signal processor, branching operations etc.) may now optionally be combined to parallel program instructions, while each program instruction provides a parallel execution of the standard operations combined by this program instruction. Particularly for the digital signal processing in the field of mobile radio (speech processing, channel coding/decoding, equalizer functions), the use of such a signal processor is advantageous because of the highly complex and specific algorithms to be converted, to which algorithms a signal processor according to the invention can be adapted by adapting its program instruction set as described above. The use of such a signal processor in a radio base station or in a mobile radio terminal may be taken, for example, from DE-A 43 44 157.

The function unit 9 establishes, also on the basis of the first field 11 of a compressed 16-bit program instruction word applied thereto, which decoder section 7 or 8 effects the decoding. Based on this evaluation, the function unit 9 generates a 1-bit control signal for controlling the multiplexer 10. Depending on which one of the two possible control states the control signal produced by the function unit 9 has, the multiplexer 10 couples either the 100 outputs of the decoder section 7 or the 100 outputs of the decoder section 8 to the 100 inputs of the register 6 to buffer the respective decompressed program instruction word in register 6 for a later use as a control signal for the signal processing.

With the signal processor structure described above, an enhanced flexibility of the signal processor is ensured. From the theoretically possible multitude of $2^{100}$ program instructions, $2^{16}$ program instructions are converted. Part of these converted program instructions (N) can be defined by the respective user who is thus capable of adapting the signal processor to highly specific applications. An extremely high degree of flexibility is ensured in that even during the operation of a device utilizing the signal processor, the program instructions included by the decoder 5 can be modified. For this purpose, the decoder section 8 arranged here as a memory is overwritten by the new decoding data.

The signal processor according to the invention can be used for digital signal processing also in other devices, for example, in radio sets for digital radio, ISDN terminals and DECT systems (not shown).

We claim:

1. A signal processor comprising:
   a program memory which stores compressed program instructions;
   a decoder device which decodes said compressed program instructions to form decoded program instructions for controlling functions of said signal processor, said decoder device having a programmable decoder and a fixed decoding arrangement, said fixed decoding arrangement being hardwired and non-programmable for decoding said compressed program instructions using logical operations; and
   a multiplexer which selectively connects one of said programmable decoder and said fixed decoding arrangement to an output of said signal processor in accordance with a category bit of said compressed program instructions.

2. The signal processor of claim 1, wherein said programmable decoder includes a decoder memory having cells for storing said decoded program instructions in an uncompressed form, said cells being addressed for executing programmable decoding functions of said programmable decoder.

3. The signal processor of claim 2, wherein said decoder memory includes a random access memory.

4. The signal processor of claim 2, wherein said decoder memory includes a read only memory.

5. The signal processor of claim 2, wherein each of said compressed program instructions includes a first number of bits for determining a category of said compressed program instructions and a second number of bits for determining an address of said cells.

6. The signal processor of claim 1, further comprising a control unit which detects said category bit of said compressed program instructions and outputs a control signal to control said multiplexer.

7. A mobile radio terminal having a signal processor which comprises: a program memory which stores compressed program instructions;
   a decoder device which decodes said compressed program instructions to form decoded program instructions for controlling functions of said signal processor, said decoder device having a programmable decoder and a fixed decoding arrangement, said fixed decoding arrangement being hardwired and non-programmable for decoding said compressed program instructions using logical operations, said decoder increasing adaptability and decreasing power consumption of said mobile radio terminal; and
   a multiplexer which selectively connects one of said programmable decoder and said fixed decoding arrangement to an output of said signal processor in accordance with a category bit of said compressed program instructions.

8. The mobile radio terminal of claim 7, wherein said programmable decoder includes a decoder memory having cells for storing said decoded program instructions in an uncompressed form, said cells being addressed for executing programmable decoding functions of said programmable decoder.

9. The mobile radio terminal of claim 7, further comprising a control unit which detects said category bit of said compressed program instructions and outputs a control signal to control said multiplexer.

10. The mobile radio terminal of claim 7, wherein said decoder memory includes a random access memory.

11. The mobile radio terminal of claim 7, wherein said decoder memory includes a read only memory.

12. The mobile radio terminal of claim 8, wherein one of said compressed program instructions includes a first number of bits for determining a category of said compressed program instructions and a second number of bits for determining an address of said cells.

13. A base station having a signal processor which comprises:
   a program memory which stores compressed program instructions; and
   a decoder device which decodes said compressed program instructions to form decoded program instructions for controlling functions of said signal processor, said decoder device having a programmable decoder and a fixed decoding arrangement, said fixed decoding arrangement being hardwired and non-programmable for decoding said compressed program instructions using logical operations, said decoder increasing adaptability and decreasing power consumption of said base station; and a multiplexer which selectively connects one of said programmable decoder and said fixed decoding arrangement to an output of said signal processor in accordance with a category bit of said compressed program instructions.

14. The base station of claim 13, wherein said programmable decoder includes a decoder memory having cells for storing said decoded program instructions in an uncompressed form, said cells being addressed for executing programmable decoding functions of said programmable decoder.

15. The base station of claim 14, wherein one of said compressed program instructions includes a first number of bits for determining a category of said compressed program instructions and a second number of bits for determining an address of said cells.

16. The base station of claim 13, wherein said decoder memory includes a random access memory.

17. The base station of claim 13, wherein said decoder memory includes a read only memory.

18. The base station of claim 13, wherein said programmable decoder includes a control unit which detects said category bit of said compressed program instructions and outputs a control signal to control said multiplexer.

19. A signal processor comprising:

a program memory which stores compressed program instructions;

a decoder device which decodes said compressed program instructions to form decoded program instructions for controlling functions of said signal processor, said decoder device having a programmable decoder and a fixed decoding arrangement, said fixed decoding arrangement being hardwired and non-programmable for decoding said compressed program instructions using logical operations, and said programmable decoder having a read only memory for permanently storing said decoded program instructions; and a multiplexer which selectively connects one of said programmable decoder and said fixed decoding arrangement to an output of said signal processor in accordance with a category bit of said compressed program instructions.

20. The signal processor of claim 19, further comprising a control unit which detects a category of said compressed program instructions and outputs a control signal; and a multiplexer which selectively connects one of said programmable decoder and said fixed decoding arrangement to an output of said signal processor in response to said control signal.

* * * * *